(12) United States Patent
Reynolds

(10) Patent No.: US 6,209,486 B1
(45) Date of Patent: *Apr. 3, 2001

(54) PET BED FOR INCONTINENT ANIMALS

(76) Inventor: Cynthia Reynolds, 2730 Willow Oak Cir., Charlottesville, VA (US) 22901

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,588

(22) Filed: Feb. 5, 1998

Related U.S. Application Data

(60) Provisional application No. 60/037,826, filed on Feb. 5, 1997.

(51) Int. Cl.⁷ .................................................. A01K 29/00
(52) U.S. Cl. ........................................ 119/28.5; 119/161
(58) Field of Search ................................ 119/28.5, 169, 119/161, 166, 753, 408, 479; 4/450, 454, 456, 452, 455, 457; 5/606, 695, 604; 52/922

(56) References Cited

U.S. PATENT DOCUMENTS

| | | | |
|---|---|---|---|
| 200,543 | * 2/1878 | Kaylor | 5/604 |
| 283,515 | * 8/1883 | Rodgers | 5/604 |
| 504,443 | * 9/1893 | Staab | 5/606 |
| 1,649,754 | * 11/1927 | Summerson | 5/604 |
| 1,820,284 | * 8/1931 | Mills | 119/28.5 |
| 1,820,285 | * 8/1931 | Mills | 5/187 |
| 1,998,061 | * 4/1935 | Wachs | 5/604 |
| 2,659,344 | * 11/1953 | Herbert | 119/28.5 |
| 2,924,832 | * 2/1960 | Knowles | 5/606 |
| 3,639,930 | * 2/1972 | Miller | 5/330 |
| 3,818,865 | * 6/1974 | Sinclair | 119/161 |
| 3,833,945 | * 9/1974 | Moody | 5/604 |
| 4,996,944 | * 3/1991 | Zook et al. | 119/20 |
| 5,211,130 | * 5/1993 | Elias et al. | 119/28.5 |
| 5,355,540 | * 10/1994 | Allen | 5/604 |
| 5,367,730 | * 11/1994 | Sher | 5/655 |
| 5,566,407 | * 10/1996 | Lien | 5/93.1 |
| 5,765,502 | * 6/1998 | Haugh | 119/28.5 |
| 5,860,389 | * 1/1999 | Caldwell | 119/28.5 |
| 5,960,739 | * 10/1999 | Storm | 119/28.5 |
| 5,988,110 | * 11/1999 | Peterson | 119/453 |

FOREIGN PATENT DOCUMENTS

2211387 * 7/1989 (GB) ............................ A01K/1/035

* cited by examiner

*Primary Examiner*—Michael J. Carone
*Assistant Examiner*—Son T. Nguyen
(74) *Attorney, Agent, or Firm*—Sheldon H. Parker

(57) ABSTRACT

An elevated pet bed is disclosed which consists of a frame, supported a predetermined height from a base surface through the use of legs. A sleeping pad is affixed to the frame, thereby suspending the sleeping pad, within the frame, above the base surface. The sleeping pad can be affixed to the frame through use of channels dimensioned to receive the frame or secured to the frame with two part hook and wool material. The sleeping pad is a non-absorbent, open weave material which allows urine to pass through to a safety pan placed on the base surface under the pad. In one embodiment, the safety pad has a perimeter slightly greater than the periphery of the frame and in another embodiment the perimeter of the safety pan is slightly less than the frame periphery. A bolster is secured along the periphery of the sleeping pad to provide a raised area for a pet to lie against. The bolster can have length equal to the periphery of sleeping pad, with one portion having a height less than the height of the remaining portion. Alternatively two bolsters can be provided with the first bolster having a length which covers a portion of the sleeping pad periphery and a second, lower, bolster which is placed along the front edge of the sleeping pad. The bolsters can be removably affixed through use of two part hook and wool material.

3 Claims, 4 Drawing Sheets

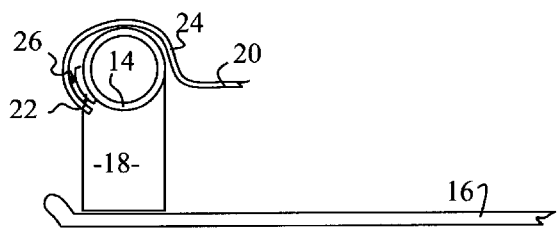
Figure 3
Figure 4
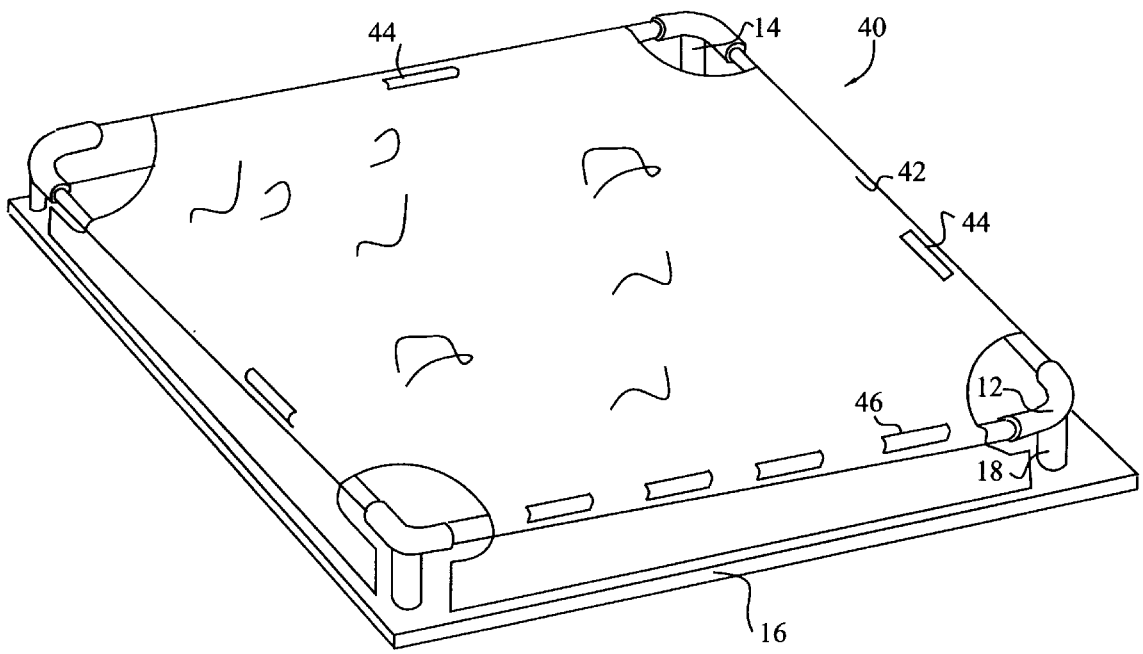

PET BED FOR INCONTINENT ANIMALS

This is a continuation-in-part of copending application Ser. No. 60/037,826 filed on Feb. 5, 1997.

BACKGROUND OF THE INVENTION

1. Field of the Invention

The invention relates to a pet bed for incontinent animals which allows for easy, sanitary cleaning of the bed while keeping the pet dry. This application claims priority to U.S. Provisional Application Ser. No. 60/037,826 filed Feb. 5, 1997.

2. Brief Description of the Prior Art

Numerous designs for pet beds exist, but none of the existing beds offer a reasonable bedding solution for animals that have developed urinary incontinence. By their nature, dogs and cats do not eliminate in or near their beds if they have a choice. Therefore, existing pet beds do not accommodate a pet that has lost control of bladder function or that has orthopedic problems preventing the pet from leaving the bed fast enough to avoid accidents. Although older spayed female domestic animals are the most likely to develop urinary incontinence, the problem also arises in males. While the pet does not suffer pain due to this impairment, the owner must deal with the inconvenience of frequent cleaning of the bedding for the animal. While a bed with a cushioned surface is most comfortable for the pet, it becomes soiled and malodorous immediately, and repeated laundering destroys the bedding. The pet, especially the elderly pet, is likely to reject a bed without a padded surface. Additionally, the animal tends to get damp and therefore cold unless the owner takes special measures.

SUMMARY OF THE INVENTION

An elevated pet bed is disclosed which consists of a frame with at least four legs, at right angles to the frame, to support the frame a predetermined height from a base surface. A sleeping pad is affixed along at least a portion of its periphery to the frame, thereby suspending the sleeping pad, within the frame, above the base surface. Preferably the sleeping pad is a non-absorbent, open weave material which allows urine to pass through the material. A safety pan is placed on the base surface under the sleeping pad to retain the urine. In one embodiment, the safety pad has a perimeter slightly greater than the periphery of the frame and in another embodiment the perimeter of the safety pan is slightly less than the frame periphery. A bolster is secured along at least a portion of the periphery of the sleeping pad to provide a raised area for a pet to lie against. In one embodiment the bolster has a length equal to the periphery of sleeping pad, with one portion having a height less than the height of the remaining portion. Alternatively two bolsters can be provided with the first bolster having a length which covers a portion of the sleeping pad periphery and a second bolster which is placed along the front edge of the sleeping pad. The second bolster preferably has a height less than the height of the first bolster. The bolsters can be removably affixed through use of two part hook and wool material.

The sleeping pad can be affixed to the frame through use of channels which are dimensioned to receive the frame. The frame is disassembled to slide the frame into said channels. Alternatively the sleeping pad can be secured to the frame with two part hook and wool material.

BRIEF DESCRIPTION OF THE DRAWINGS

The advantages of the instant disclosure will become more apparent when read with the specification and the drawings, wherein:

FIG. 3 is a cutaway side view of the frame and sleeping surface attachment using hook and wool material to affix the pad to the frame;

FIG. 4 is a perspective view of an alternate pad for use with the frame and pan of FIG. 1 using a hook and wool attachment system;

DETAILED DESCRIPTION OF THE INVENTION

This invention provides a comfortable sleeping surface that is easy to clean, does not absorb liquids, and allows urine to seep through to an underlying pan. The pan protects the floor and aids in cleaning. Preferably, the invention provides a bolster cushions for a comfortable surface which the pet can curl against for warmth and security. The bolster is attached to the sleeping surface but easily removable for laundering. This bed further provides a padded surface across the front for the pet to rest its front paws and head on a soft surface and survey the environment. The bed is slightly elevated for ease of placement and removal of the underlying pan, but must not be so high that the pet finds entry difficult. The frame for the bed is made of any lightweight material, such as PVC pipe, that is easy to lift and move and is easy to wipe clean with any household cleaning product. In the preferred embodiment the sleeping pad is suspended like a trampoline across the frame and is manufactured from a material which is readily cleaned with a spray cleaner and cloth.

Figure 1:
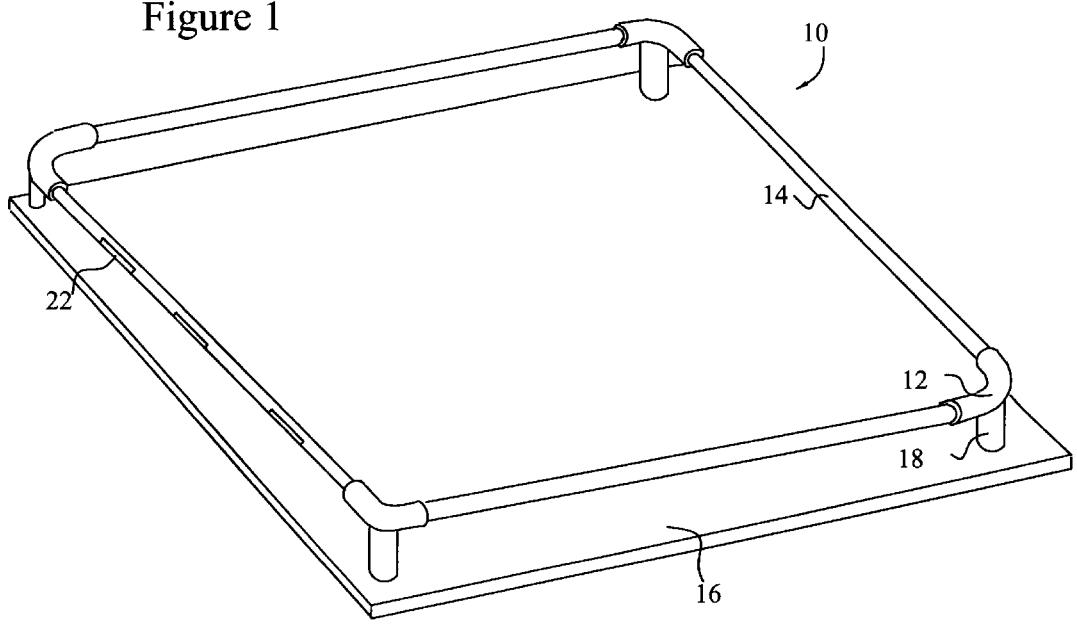
FIG. 1 is a perspective view of the frame and pan of the invention.

Referring now to the drawings, wherein like reference numerals designate identical or corresponding parts throughout the several views. FIG. 1 illustrates the pet bed 10 frame 14 and pan 16. The frame 14 has been placed on the safety pan 16 and is ready to accept the sleeping pad 20, illustrated in FIG. 2. The frame 14 is preferably manufactured from plastic piping, such as polyvinylchloride (PVC), or an equivalent. The use of PVC piping is advantageous in that it is lightweight yet strong and can be cleaned as often as necessary by spraying and wiping with any household cleaner. It is extremely durable and will not stain or absorb odors or bacteria. The embodiment illustrated in FIG. 1 uses four legs 18, placed at the corners, to raise the bed off the floor. The legs 18 must of a height which allows the pet to enter the bed without difficulty and coordinate with the depth of the sleeping pad 20. Although the preferred means of attaching the sleeping pad 20 to the frame 14 is by forming stitched channels 82 along the edges of the sleeping pad 80 of FIG. 8, hook and loop material can also be used to attach the pad 20 to the frame 14, as shown in FIG. 3. In the hook and loop attachment, one part of a two part hoop and wool system, preferably the hook portion 22, has been attached to the frame 14 through use of appropriate adhesives, as known in the art. It is preferable to use the hook portion 22 on the frame 14, thereby allowing the wool portion to be affixed to the sleeping pad 20, providing the user the option of machine washing the pad 20.

The safety pan 16, as displayed, is molded Fiberglas and fits under the legs 18, protecting the floor from accidents. In an alternate embodiment, illustrated in FIG. 2, the pan 36, is slightly smaller than the frame, allowing all four legs of the frame to rest just outside the pan. The pan can be removed easily to either clean the pan or remove any paper or lining materials. The pan, in either embodiment, allows the pet bed to be used on carpeted surfaces. The pan could alternatively be made of molded plastic, which would provide equivalent protection and ease of cleaning.

Figure 2:
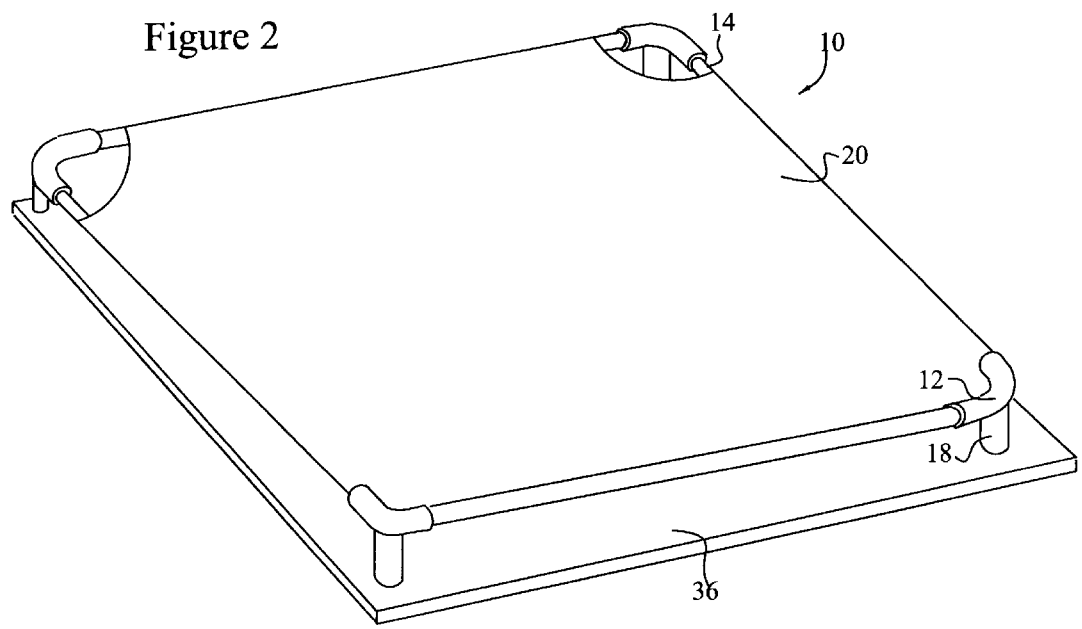
FIG. 2 is a perspective view of the frame of FIG. 1 with a sleeping pad attached.

In FIG. 2 the sleeping pad 20 has been placed over the frame 14. Alternately, the wool portion of the sleeping pad 20 being affixed to the hook portion 22 on the frame 14. The hook portion 22 can be a single strip placed along the length of the frame 14 or in multiple sections placed along the frame 14. The attachment of the sleeping pad 20 to the frame 14 is further illustrated in FIG. 3. The sleeping pad 20 is manufactured from a vinyl mesh fabric which allows for the urine to be transferred directly to the safety pan 16. The vinyl mesh fabric is nonabsorbent, will not stain and can be cleaned as often as necessary by spraying and wiping with any household cleaner. Outdoor vinyl mesh or textilene is preferable because of its extreme durability and strength, its ability to allow liquid to flow through, its ease of cleaning, and its resistance to odor absorption. The spacing of the strands of the mesh should be no more than 18 strands per inch, to allow for the surface tension of liquids. Although an even more open mesh with fewer strands per inch provides a greater flow through, the mesh must not be so open that the animal's nails can penetrate or be caught in the fabric, potentially causing the loss of a nail. The mesh further allows air to circulate, increasing ventilation and evaporation. Other fabrics which also meet these criteria would also be suitable for the sleeping surface. The sleeping pad 20 is provided with attachment wraps 24 which must have a length sufficient to wrap around the frame 14 to attach to the hook portion 22. The wraps 24 are provided with wool strips 26 which coordinate with, and attach to, the hook portions 22.

Figure 8:
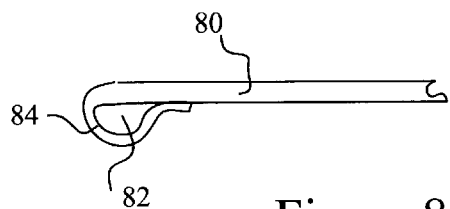
FIG. 8 is a side view of the sleeping pad using stitched channels to receive the frame of FIG. 1.

The sleeping pad 80 of FIG. 8 has approximately the same dimensions as the sleeping pad 20, however instead of affixing one part of a two part hook and loop system, the attachment wrap portion 84 is stitched to the pad 80 to form the channel 82. The frame 14 is disassembled for the initial mounting of the pad 80. The use of the mesh allows the pads 20 and 80 to be cleaned through use of a spray on cleaner and further removal of the pad 80 is unnecessary.

Figure 5:
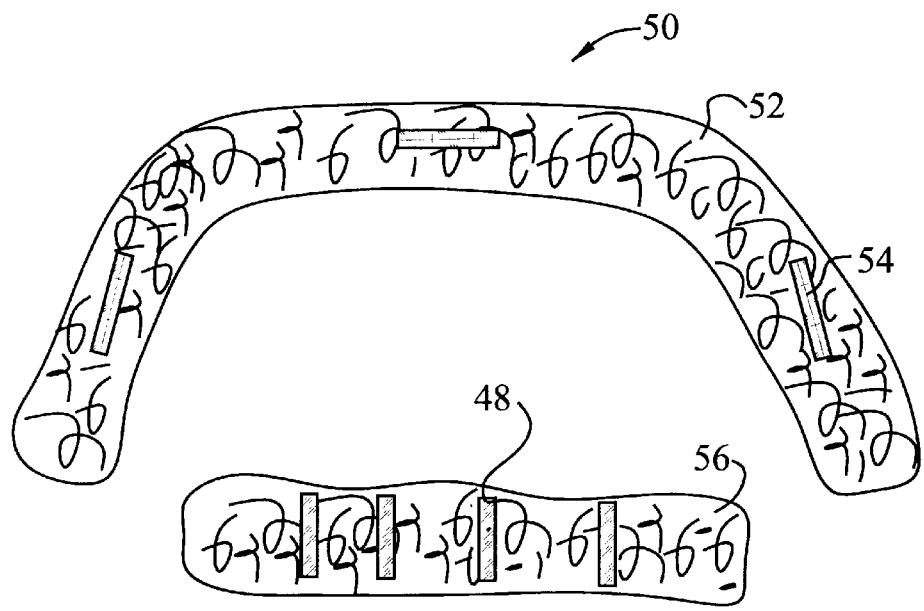
FIG. 5 is a perspective view of the bolsters for use with the disclosed pet bed.
Figure 6:
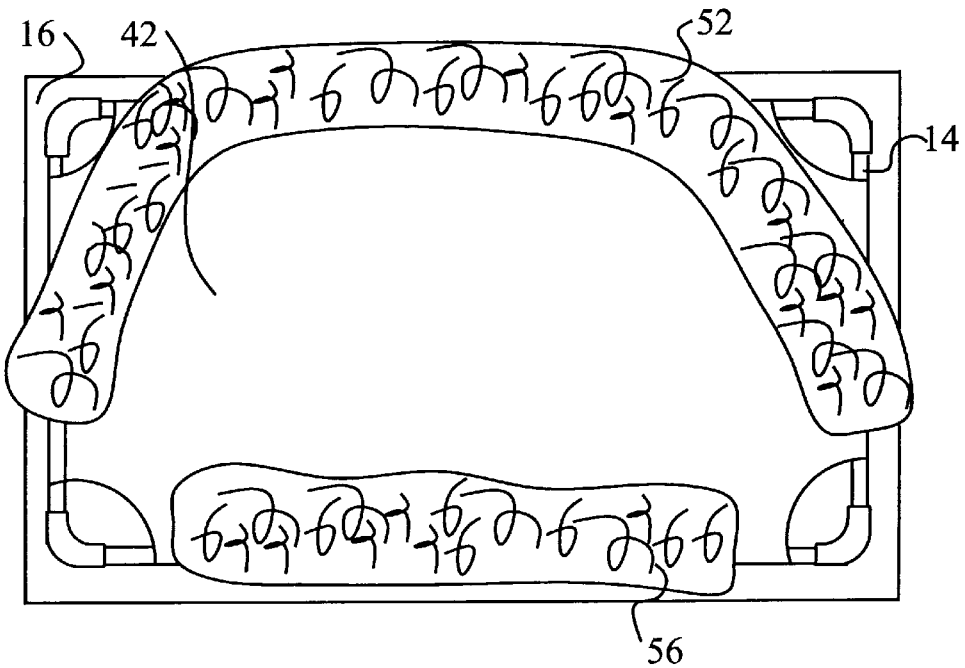
FIG. 6 is a perspective view of the bolsters of FIG. 5 affixed to the sleeping pad.

The pet bed 40 illustrated in FIG. 4, utilizes an alternate sleeping pad 42 which is dimensioned to be used in conjunction with the frame 14. The sleeping pad 42 incorporates hook and wool attachment tabs 44 and 46 which maintain the padded bolster system 50, illustrated in FIGS. 5 and 6, in place.

The bolster system 50 comprises a rear bolster 52 and a front bolster 56. The rear bolster 52 has one portion of a two portion hook and wool 54 attached to the underside of the bolster 52 and positioned to interact with the opposite portion of the hook and wool 44 placed on the pet bed 40. The front bolster 56 is provided with hook and wool tabs 48 to interact with the hook and wool tabs 46 placed on the pet bed 40. The bolster system 50 design allows the animal to curl comfortably against the bolsters 52 and 56 for warmth and security, yet prevents the pet from sleeping with its problematic hindquarters on the bolsters. The front edge bolster 56 is nearly flat and allows the animal to rest its front paws and head on a soft plush surface. The pet can easily step over the flat bolster onto the bed. The bolsters 52 and 56 are easily removed for laundering and easily replaced afterward. Although the preferred embodiment utilizes hook and loop fastening strips, other convenient means of securing the bolsters 52 and 56 to the sleeping pad 42 may be used.

Figure 7:
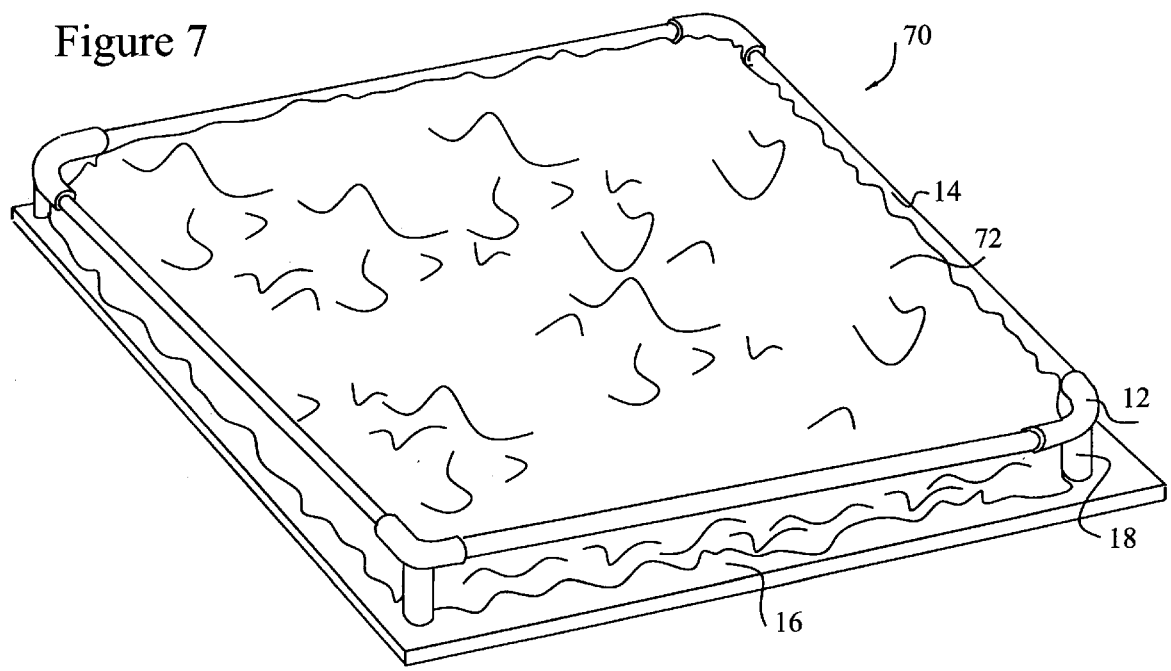
FIG. 7 is an additional embodiment of a pad for use with the frame of FIG. 1.

In the bed system 70 illustrated in FIG. 7, the sleeping pad 72 has been dimensioned to be placed within the frame 14. The sleeping pad 72 is manufactured as noted heretofore without the wraps 24 disclosed in the foregoing figures.

A modification to this design would add a washable pad to the sleeping surface for increased comfort and to minimize residual moisture in the pet's coat. Obviously, many other modifications and variations of the present invention are possible in light of the above teachings. It is therefore to be understood that, within the scope of the claims, the invention may be practiced otherwise than specifically described.

EXAMPLES

The prototype bed was an attempt to provide a suitable bed for an incontinent pet, as none of the commercially available beds were suitable for the pet with urinary incontinence. This example bed is a rectangle 26 inches wide and 20 inches long, six inches off the floor. The sleeping surface is outdoor vinyl mesh and is sewn onto the frame with a channel for the PVC pipe to pass through. The bed can be disassembled for thorough cleaning if desired. The legs are six inches long which allows a medium sized pet adequate entry. Future models will likely have shorter legs for easier access. The pan under the bed frame can be lined with plastic-backed absorbent pads, newsprint, or any other material intended or effective in assisting with cleanup. Alternatively, the pan may not be lined at all; simply sprayed and wiped clean with any household cleaner like the sleeping surface and frame. The bolsters are crafted of washable plush fabric, tightly stuffed so that the pet will not lie on the bolsters, but will curl up against them. The front pad is lightly stuffed to lie flat against the frame edge so that the pet can step into the bed and so the pet can rest its front paws and head on the frame, but will not lie with its hindquarters resting on the pad.

Although the embodiment illustrated herein is rectangular, the configuration of the frame can be any number of alternate shapes. Larger beds may require additional legs to provide support for heavier dogs, however this will be obvious to anyone versed in the art. If so desired, elastic can be used between the attachment wrap and the body of the bed to provide additional "give" to the bed. Other materials can also be used to manufacture both the frame and the pad, however the materials must be durable, easily cleaned, as well as moisture and mold resistant.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A method of providing a dry bedding system for incontinent pets having:

a frame, said frame having at least four legs, said at least four legs raising said frame from a base surface a distance sufficient to maintain the pet off the floor and still enable the pet to step easily onto a sleeping pad, a sleeping pad, said sleeping pad being affixed to said frame and suspended within said frame above said base surface, said sleeping pad being an open weave material having 18 strands or less per inch which allows urine to pass through said material without absorbing said urine while having sufficient strands per inch to prevent the pet's nails from penetrating said material, safety pan, said safety pan having a perimeter substantially equal to said frame and being placed on said base surface under said sleeping pad to directly receive and retain said urine, comprising the steps of:

supporting the pet on said sleeping pad, the pet being positioned any where on said sleeping pad enabling urine from the pet to drain through said open weave material of said sleeping pad, collecting said urine in said safety pan, disposing of said urine by removal of said safety pan, wherein the pet remains dry and comfortable and said urine is conveniently collected for disposal.

2. The method of claim 1, further comprising positioning a first bolster on said sleeping pad and securing said first bolster to said sleeping pad, thereby providing a structure for said pet to lie against.

3. The method of claim 2, further comprising a second bolster, said second bolster having a height from said sleeping pad that is less than the height of said first bolster from said sleeping pad.

* * * * *